Figure 1:
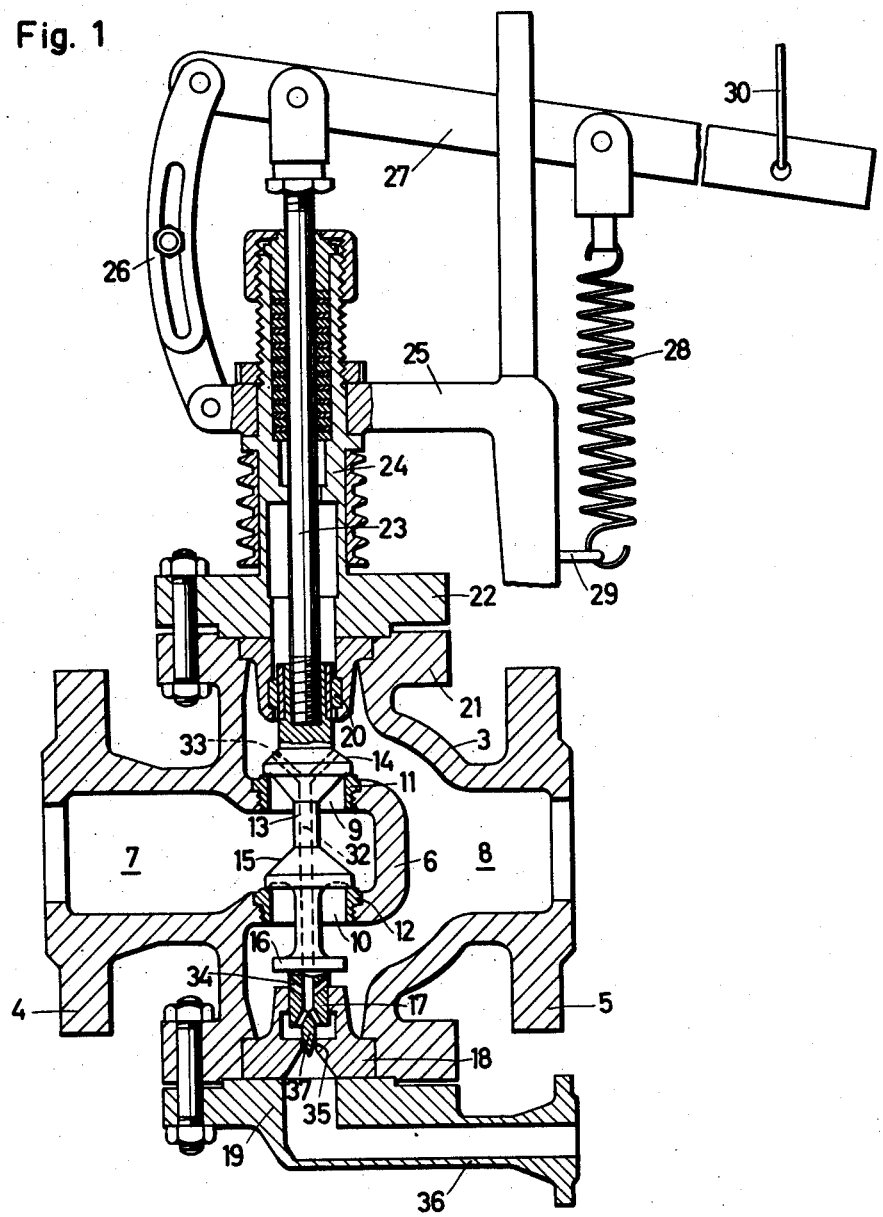

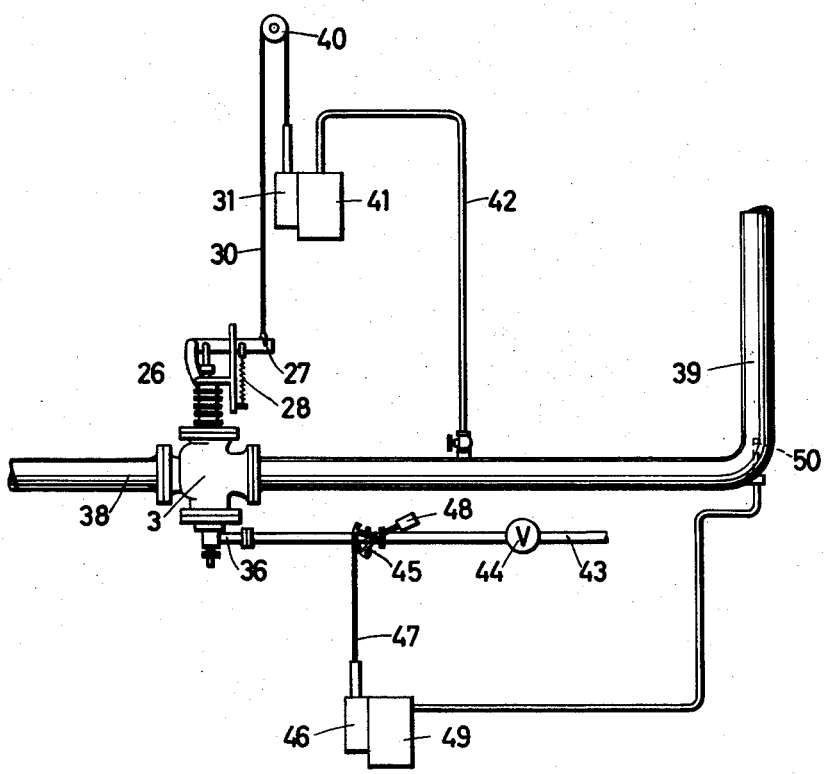

United States Patent Office 3,150,687
Patented Sept. 29, 1964

3,150,687
HIGH PRESSURE VALVE
Karl Torsten Kalle, Sandbacken, Säffle, Sweden
Filed Oct. 8, 1962, Ser. No. 229,041
Claims priority, application Sweden Dec. 20, 1961
4 Claims. (Cl. 137—625.4)

The invention relates to a high pressure valve for converting superheated high pressure steam into steam of lower pressure and temperature. The valve is of the type which comprises a housing having an inlet chamber surrounded by an outlet chamber. Two ports formed as valve seats are provided in two opposite walls of the inlet chamber, and two valve members, one inside and one outside said inlet chamber, are each adapted to cooperate with one of said seats. Both valve members are carried by a common valve spindle extending axially through the ports and movable in axial direction.

Generally, the valve ports have substantially equal cross section areas, and the purpose of this two-port construction is to relieve or balance the great static pressure that would otherwise counteract the opening of the valve in the case of a fluid of high pressure. The dynamic pressure occurring at the opening of the valve is counteracted or, at best, entirely balanced by means of a disk provided concentrically on the spindle outside the port which cooperates with the valve member located within the inlet chamber, said disk being adapted, when the valve is opened, to be hit by the escaping pressure fluid so as to counteract said dynamic pressure. Said dynamic pressure will be substantially entirely balanced if the disk has about the same diameter as the two outlet ports.

In superheater valves of this type channels for supply of water are provided to open into the outlet chamber of the valve, and the supply of water through these channels is then controlled in proportion to the opening of the steam valve. A correct proportioning of the supply of water is of essential importance for a reliable operation of such valves, especially if the high pressure steam is to be reduced to saturated steam of a predetermined temperature. In this respect, however, the valves hitherto used are not quite satisfactory. Thus, when the steam valve is throttled and consequently the water supply valve is also throttled correspondingly, the small amounts of water supplied at a rather low pressure are not capable of overcoming the steam pressure and this results in an insufficient supply of water and also in a less effective admixture of the water into the steam. According to the invention, at least one such channel extending through the spindle ends near the outside of the pressure balancing disk carried by the spindle. Such an arrangement has the advantage that even small quantities of water introduced at a considerable throttling of the steam valve are effectively distributed and mixed into the steam. When the flow of pressure fluid is throttled, a considerably lower pressure occurs at the outside of said spindle disk as the steam expelled around the periphery of the disk exercises an ejector-like action. The introduction of the water at this place will thus not be counteracted by a high steam pressure, but even small amounts of water supplied are effectively distributed in the steam. Also, such lower pressure will effectively contribute in atomizing the jets of water which in this case may be introduced at a slight overpressure only.

An embodiment of the valve according to the invention will be described below with reference to the accompanying drawings, in which FIGURE 1 shows a longitudinal section through a steam valve provided with a device for injection of water, while FIGURE 2 shows, on a smaller scale, a diagrammatic view of an arrangement of regulators for controlling the operation.

In FIGURE 1, 3 designates a valve housing having a flanged inlet pipe socket 4 and a flanged outlet pipe socket 5 for mounting in a steam conduit. The housing is divided into two compartments by means of a cup-shaped member 6 enclosing an inlet chamber 7 and externally enclosed by an annular outlet chamber 8. The cylindrical wall of the member 6 has two diametrically opposed ports 9, 10 directed perpendicularly to the main direction of flow and provided with annular valve seats 11 and 12, respectively. A spindle 13 extending axially through the valve ports 9, 10 is mounted to be moved in axial direction. The spindle is provided with valve members 14, 15 adapted to engage simultaneously the valve seats 11 and 12, respectively, when the spindle is moved downwards in FIG. 1. The valve member 14 is located in the outlet chamber 8, whereas the valve member 15 is located in the inlet chamber 7. Outside the port 10 the spindle carries a concentric disk 16 preferably having about the same diameter as the port 10. The end 17 of the spindle outside the disk 16 is slidably guided in a closely surrounding opening through the wall of a minor box 18 inserted in a flanged opening of the valve housing 3. The upper end of the spindle is slidably guided in a packing box 20 which is secured in an opposite opening of the valve housing by means of a cap 22 fixed to a flange 21 by bolts. The upper end of the spindle 13 is threaded to a rod-shaped extension 23 which is slidably guided in a sleeve 24 mounted on the cap 22. The sleeve contains a bushing and is externally provided with cooling flanges. A bracket 25 is mounted on the exterior of the valve housing 3 and a link 26 has one end hingedly connected to it. The opposite end of the link 26 is hingedly connected to one end of a lever 27. At a short distance from the link 26 the lever 27 in hingedly connected to the outer end of the valve rod 23. Thus, the lever may be pivoted to adjust the valve spindle in a desired, more or less throttling or entirely closing position. A tension spring 28 having one end anchored to a lug 29 provided on the bracket 25 is connected to the lever 27 to urge it to pivot in such a direction that the valve is closed. A wire 30 secured to the outer end of the lever extends to a servo motor 31 (shown diagrammatically in FIG. 2) controlled by a regulator. In operation, said motor exerts a tractive force in a direction opposite to that of the spring 28, thus adjusting the valve in a more or less open position.

The valve spindle 13 is provided with an axial channel 32 extending from the free, lower end of the spindle to the valve member 14 located next to the opposite spindle end. A number of substantially radial channels 33 extending from said axial channel 32 pass through the valve member 14 to its outside. Similarly, substantially radial channels 34 extend from the axial channel 32 through the end portion 17 of the spindle and open into the outlet chamber 8 immediately below the disk 16. The box 18 receiving the end 17 of the spindle has an opening 35 located axially outside the spindle in communication with a connection tube 36 extending from a thrust water service. A flange 19 on said tube 36 is secured to the flange surrounding the box 18. The opening 35 is throttled by a valve needle 37 projecting from the end of the spindle and adapted to close simultaneously with the valve members 14, 15. Moreover, said valve member 37 may be dimensioned such that, on opening the steam valve, water will be introduced substantially in proportion to the amount of steam supplied. Such a proportionation is previously known per se, although the steam valve and the water valve were then connected by means of links highly subjected to wear so that the lost motion caused thereby resulted in reduced accuracy. The inconvenience is now eliminated in that the water valve is rigidly connected to the steam valve.

In the embodiment shown, the two valve seats 11 and 12 have equal diameters, and the same applies to the valve members 14 and 15. In the closed position of the valve shown in FIG. 1 the spindle 13 is balanced as the same static pressure acts in opposite directions on the two valve members. When the valve is slightly opened, however, the escaping steam causes a dynamic pressure on the side of the valve member 14 facing the direction of flow and if no particular steps were taken a correspondingly high force would be required to keep the spindle in the desired throttling position. Thanks to the device according to the invention the spindle will now be balanced also against this vis viva, as the steam escaping through the opening 10 hits the disk 16 with an equally great force of opposite direction. This effect should be of importance in all high pressure valves of similar construction, and therefore the invention is not limited to steam valves exclusively.

When the steam valve described is set in a throttling position, the steam expelled around the periphery of the disk 16 exercises an ejector-like action resulting in the formation of a negative pressure at the rear of the disk, and hereby the rather small amounts of water supplied through the channels 34 are effectively distributed in the steam. On throttling the valve to a great extent, the negative pressure mentioned may even become so great that in addition to the controlled amount of water also steam is sucked from the opposite side of the chamber 8 through the radial channels 33, the axial channel 32 and the channels 34, and in this way the water will be still more finely dispersed in the steam. Thus, the valve has a good efficiency also in the event that only small amounts of reduced steam are drawn off. When the valve is opened to discharge greater amounts of steam, the negative pressure at the rear of the disk 16 is no longer so marked and as now also the valve needle 37 is opened more to permit a correspondingly larger supply of water, the negative pressure in the channel 32 is wholly eliminated so that water is also supplied through the channels 33 in the valve member 14.

In FIGURE 2, the steam valve described is used in an automatically controlled plant for converting superheated high pressure steam into saturated or only slightly superheated low pressure steam. The high pressure steam is conducted to the valve housing 3 through a conduit 38, and the cooled steam is discharged to a place of consumption through a conduit 39. The above-mentioned wire 30 from the valve adjusting lever 27 to the servo motor 31 passes over a pulley 40. The servo motor, which as known may consist of a cylinder with a hydraulically operated piston, is controlled by a regulator 41 sensitive to pressure impulses and communicating with the low pressure conduit 39 by means of an impulse conduit 42. Irrespective of the steam consumption, the regulator 41 keeps the pressure in the conduit 39 practically constant by causing the servo motor 31 to open or throttle the steam valve to a required degree. Of course, the regulator should be adjustable for changing the pressure of the steam discharged.

A thrust water conduit 43 containing a reduction valve 44 is connected to the supply tube 36. The reduction valve is adjusted to supply the water at a pressure sufficient to counterbalance the resistance in the supply channels and the steam pressure in the conduit 39. Therefore, the valve 44 need only be adjusted when readjusting the regulator 41 to keep another pressure of the cooled steam.

The plant described so far operates with an accuracy sufficient for most purposes. However, two possible sources of errors have not been considered. On the first hand, the temperature of the high pressure steam supplied may vary somewhat, and on the other hand it may be difficult to proportion the required amount of cooling water exactly despite a careful dimension of the valve needle 37 inserted in the passage 35. Firstly, the amount of water is to some extent dependent on the pressure kept in the tube 36 by the reduction valve 44 and, secondly, a certain wear of the valve member 37 cannot be avoided. To eliminate these sources of error the valve needle 37 may be dimensioned to admit some excess of water, calculated on the amount of steam and after the reduction valve 44 a throttle valve 45 may be inserted in the conduit 43 to throttle the supply of water in dependence on the temperature of the steam in the conduit 39. In the known way, the valve 45 is adjusted by a servo motor 46 turning the valve fly by means of a wire 47 in one direction against the action of a counterweight 48. The servo motor 46, which preferably is of the same kind as that mentioned previously, is controlled by a regulator 49 operating in dependence on impulses from a temperature responsive member 50 inserted in the conduit 39. The construction of the regulator as well as of the impulse member may vary; essential is only that irrespective of the temperature of the high pressure steam supplied and of the consumption of low pressure steam the regulator should keep a constant temperature in the conduit 39 by controlling the amount of cooling water. In other words, the temperature regulator 49 performs a fine regulation of the operation of the pressure regulator 41, so that the cooled steam discharged will always exhibit practically constant physical values.

What I claim is:

1. A high pressure valve, adapted to convert superheated high pressure steam into steam of lower pressure and temperature, comprising a housing having an inlet chamber and a surrounding outlet chamber, two ports formed as valve seats in two opposite walls of the inlet chamber, two valve members, one inside and one outside said inlet chamber, each adapted to cooperate with one of said seats and both carried by a common valve spindle extending axially through the ports and movable in axial direction, a disk provided concentrically on the spindle outside the port which cooperates with the valve member located within the inlet chamber, said disk being adapted, when the valve is opened, to be hit by the flowing pressure fluid so as to counteract and balance the dynamic pressure, an axial channel in the spindle extending from the spindle end outside the disk, at least one substantially radial channel extending from the axial channel and ending in the outlet chamber near the outside of the disk, a conduit for supply of water communicating with said channeled spindle end, said conduit providing a valve seat and a valve member provided at said spindle end and movable therewith to throttle the communication between the axial channel and the conduit valve seat substantially in dependence on the opening of the valve ports.

2. A steam valve as claimed in claim 1, in which at least one substantially radial channel extending from said axial channel is ending at the outside of the valve member located in the outlet chamber.

3. A high pressure valve, adapted to convert superheated high pressure steam into steam of lower pressure and temperature, comprising a housing having an inlet chamber and a surrounding outlet chamber, two ports formed as valve seats in two opposite walls of the inlet chamber, two valve members, one inside and one outside said inlet chamber, each adapted to cooperate with one of said seats and both carried by a common valve spindle extending axially through the ports and movable in axial direction, a disk provided concentrically on the spindle outside the port which cooperates with the valve member located within the inlet chamber, said disk being adapted, when the valve is opened, to be hit by the flowing pressure fluid so as to counteract and balance the dynamic pressure, an axial channel in the spindle extending from the spindle end outside the disk, at least one substantially radial channel extending from the axial channel and ending in the outlet chamber at the outside of the disk, a conduit for supply of water communicating with said channeled spindle end, a valve member provided at said spindle end to throttle the communication between the axial channel and the conduit substantially in dependence on the opening of the valve ports, said valve throttling the inlet to the axial channel being dimensioned to supply a quantity of water a little too great in relation to the quantity of steam discharged, a valve mounted in the water supply conduit.

4. A high pressure valve, adapted to convert superheated high pressure steam into steam of lower pressure and temperature, comprising a housing having an inlet chamber and a surrounding outlet chamber, two ports formed as valve seats in two opposite walls of the inlet chamber, two valve members, one inside and one outside of said inlet chamber, each adapted to cooperate with one of said seats and both carried by a common valve spindle extending axially through the ports and movable in axial direction, a disk provided concentrically on the spindle outside the port which cooperates with the valve member located within the inlet chamber, said disk being adapted, when the valve is opened, to be hit by the flowing pressure fluid so as to counteract and balance the dynamic pressure, at least one water supply channel extending through the spindle and ending in the outlet chamber near the outside of said disk, and means provided to open the channel substantially in dependence on the opening of the valve ports.

References Cited in the file of this patent

UNITED STATES PATENTS

| | | |
|---|---|---|
| 881,871 | Rice | Mar. 10, 1908 |
| 989,235 | Day | Apr. 11, 1911 |
| 2,138,064 | Howell | Nov. 29, 1938 |
| 2,187,811 | Smith | Jan. 23, 1940 |

FOREIGN PATENTS

| | | |
|---|---|---|
| 296,667 | Italy | May 21, 1932 |